US010406971B2

(12) United States Patent
De Baca et al.

(10) Patent No.: US 10,406,971 B2
(45) Date of Patent: Sep. 10, 2019

(54) WEARABLE WIRELESS ELECTRONIC SIGNALING APPARATUS AND METHOD OF USE

(71) Applicants: Christopher Troy De Baca, Aurora, CO (US); Dario Tucciarelli, Denver, CO (US)

(72) Inventors: Christopher Troy De Baca, Aurora, CO (US); Dario Tucciarelli, Denver, CO (US)

( * ) Notice: Subject to any disclaimer, the term of this patent is extended or adjusted under 35 U.S.C. 154(b) by 55 days.

(21) Appl. No.: 15/660,865

(22) Filed: Jul. 26, 2017

(65) Prior Publication Data

US 2018/0194274 A1 Jul. 12, 2018

Related U.S. Application Data

(60) Provisional application No. 62/444,212, filed on Jan. 9, 2017.

(51) Int. Cl.
*B60Q 1/00* (2006.01)
*G01C 21/26* (2006.01)
(Continued)

(52) U.S. Cl.
CPC ....... *B60Q 1/2673* (2013.01); *A41D 19/0013* (2013.01); *A41D 19/0027* (2013.01);
(Continued)

(58) Field of Classification Search
CPC combination set(s) only.
See application file for complete search history.

(56) References Cited

U.S. PATENT DOCUMENTS 9,521,732 B1 * 12/2016 Spofford ............... H04W 4/029
2010/0052897 A1 * 3/2010 Allen .................... A61B 5/411
340/539.12
(Continued)

*Primary Examiner* — Adam D Tissot
*Assistant Examiner* — Edward J Pipala
(74) *Attorney, Agent, or Firm* — Christopher Mayle; John D. Houvener; Bold IP, PLLC

(57) ABSTRACT

The present invention relates to a device and a method associated with the device. With respect to the device, it is a wearable garment for the hand, wrist, and/or forearm with an embedded array of lights; one or more micro processing units; one or more touch or pressure activated switches, buttons, or toggles; one or more motion sensing mechanisms; and one or more wireless transmission components which is capable of receiving and transmitting information to a mobile computing device. A wireless transmission device is also disclosed which is attached or embedded in a vehicle connected to the turn signaling system. The mobile computing device such as a smartphone or GPS unit tracks the wearer's location and route and transmits a signal to the wearable garment when a turn approaches causing haptic feedback vibration to the wearer and activation of the embedded lights on the appropriate side. The wearable garment also transmits and receives signals from the wireless transmission device in the vehicle which activates or deactivates the turn signals on the vehicle when the wearable garment's lights and haptic feedback mechanisms are activated or deactivated, and reciprocally the lights and haptic feedback systems on the wearable garment when the turn signal on the vehicle is activated or deactivated. The wearable garment signaling system may be activated by the user's hand/arm motions, by actuation of embedded switches, buttons, or toggles, or by signal from the mobile computing device.

23 Claims, 3 Drawing Sheets

(51) Int. Cl.
  *B60Q 1/26* (2006.01)
  *B60Q 9/00* (2006.01)
  *A41D 19/00* (2006.01)
  *H04W 4/40* (2018.01)
  *G08B 7/00* (2006.01)
  *G01S 19/13* (2010.01)
  *H04W 84/12* (2009.01)
  *G08B 6/00* (2006.01)
  *G08B 5/36* (2006.01)
  *H04W 4/80* (2018.01)
  *G01S 19/42* (2010.01)

(52) U.S. Cl.
  CPC ....... *A41D 19/0031* (2013.01); *B60Q 1/0076* (2013.01); *B60Q 9/00* (2013.01); *G01C 21/26* (2013.01); *G01C 21/265* (2013.01); *H04W 4/40* (2018.02); *B60Q 2900/30* (2013.01); *G01S 19/13* (2013.01); *G01S 19/42* (2013.01); *G08B 5/36* (2013.01); *G08B 6/00* (2013.01); *G08B 7/00* (2013.01); *H04W 4/80* (2018.02); *H04W 84/12* (2013.01)

(56) References Cited

U.S. PATENT DOCUMENTS

| | | | | |
|---|---|---|---|---|
| 2010/0134327 | A1* | 6/2010 | Dinh | G06F 3/014 341/20 |
| 2011/0004072 | A1* | 1/2011 | Fletcher | A61B 5/0002 600/300 |
| 2014/0240103 | A1* | 8/2014 | Lake | G08C 17/02 340/12.5 |
| 2015/0317885 | A1* | 11/2015 | Ramstein | G08B 6/00 340/407.1 |
| 2016/0062572 | A1* | 3/2016 | Yang | G06F 3/0482 715/835 |
| 2017/0116827 | A1* | 4/2017 | Clarke-Stone | G08B 7/06 |
| 2017/0178114 | A1* | 6/2017 | Levesque | G06F 1/163 |
| 2018/0082501 | A1* | 3/2018 | Kochhar | G06F 1/163 |

* cited by examiner

WEARABLE WIRELESS ELECTRONIC SIGNALING APPARATUS AND METHOD OF USE

CROSS-REFERENCE TO RELATED APPLICATIONS

This application claims priority to U.S. Provisional Application No. 62/444,212 filed Jan. 9, 2017. The content of the above application is incorporated by reference in its entirety.

FIELD OF THE DISCLOSURE

The field of invention generally is related to electronic "smart" wearables.

BACKGROUND

Engine and human-powered personal vehicles such as bicycles and motorcycles present enhanced safety risks to both riders and collaterals such as other personal vehicle riders, motor vehicle operators, and pedestrians because of the greater speeds, weight, and smaller, less visible profiles involved. This enhanced risk is magnified substantially in low visibility conditions that occur during nighttime and inclement weather. Of paramount importance therefore to the maintenance of safe commuting environments is the necessity for visibility and clear communication of intention on behalf of the rider to those around her or him both on foot and on commute.

In addition, with the widespread popularity and use of mobile devices such as smartphones, tablets, and portable GPS devices as real-time navigational aids, an unexploited opportunity presents itself in linking such devices with wearables to allow presentation of navigational information in new ways other than through some form of display that requires the rider to turn her or his attention away from the road, presenting a safety risk to both the vehicle operator and others.

An additional problem presents in the need for greater visibility of smaller personal vehicles and craft to other riders, drivers, and pedestrians. Imperfect solutions largely consist of static illuminants such as bicycle lights and reflectors and government-mandated head and rear lights and signals for motorcycles and other engine powered vehicles sharing public roadways. What each of these solutions lack is a means of dynamic signaling of intention by the rider that is both easily recognizable and easy to accurately activate spontaneously and without distraction by the operator.

A wearable device which operates to allow riders of both human- and engine-driven apparatuses sharing public streets and roads to seamlessly receive navigational prompts and related information by means other than distracting electronic displays or personal audio devices—which in many jurisdictions have been made illegal to use while operating a motor vehicle—would facilitate the long needed marriage of readily available and useful navigational prompting and information delivery with maintenance and even enhancement of the operator's focus and attention.

Furthermore, the narrow profile of one to two person vehicles such as motorcycles and bicycles presents an additional difficulty in creating a vehicle mounted signaling system that allows for adequate and unambiguous indication of change of direction, i.e., a turn or lane change to the left or right. A universally accepted system for this has not yet been developed or adopted, particularly for unpowered vehicles such as bicycles.

A solution to the joined problems of signaling course changes for personal vehicles to others and for riders to receive route information without distraction is described in the present disclosure as a wearable that incorporates haptic feedback from wireless navigational devices and automatically (as well as manually) triggered signal lights.

SUMMARY

The wearable wireless electronic signaling apparatus includes a fitted elastic wearable article housing a dorsum aspect external electrical luminescent diode array, an electronic haptic feedback mechanism, and a pressure and/or heat and/or capacitance sensitive electronic and/or mechanical triggering apparatus each separately and individually connected to an embedded circuit complex housed between the inner and outer layers of the article or enmeshed within a single layer of same. Said circuit complex includes a personal-area-network range wireless receiver and digitizer capable of receiving at least two simultaneous signals using one more wireless transmission protocols and a gyrometer, accelerometer, and/or inclinometer to monitor and determine the stationary and active relative position and movement of the wearable. The circuit complex may be arranged and distributed throughout the article in any suitable configuration. The diode array may be arranged in any appropriate pattern gesticulating a distal direction. The electronic triggering apparatus may be comprised of any discrete pressure, heat, or capacitance sensing and activated switch, button, or touchpad such as a pushbutton, reed switch, toggle, rocker switch, slide pot, or capacitive or resistive touch sensor and may be positioned at any suitable point or distributed along the palmar aspect of the article to allow for pinch or clench self-activation, pressing against an external surface such as a handle, or other similar means of activation.

The wearable wireless electronic signaling apparatus may be connected to a multitude of external "smart" devices such as mobile smartphones, tablets, computers, watches, or glasses capable of operating one or more software applications which transmit data to the wearable. Said external devices transmit unidirectional information to or establish a connection with (e.g., are "paired" with) the wearable on a dedicated personal-area-network wireless transmission protocol with or without encryption according to the parameters of the protocol in use. The external device connects to local and/or remote data sources for navigational information utilizing GPS, Wi-Fi positioning, cellular network tracking, or other methods of geolocation to determine the wearer's approximate location, directional vector, speed and acceleration, and to determine upcoming course changes for communication through the software application to the wearable.

The wearable wireless electronic signaling apparatus consists also of an optional dedicating wireless transmitting apparatus connected to an external mechanism on the wearer's vehicle. Said wireless transmitting apparatus intercepts signals or kinetic actuation from the vehicle's turn signaling system and transmits a wireless signal to the wearable on a shared protocol which causes independent activation of the diode array.

The wearable wireless electronic signaling apparatus may be utilized by any operator of a personal human- or motor-powered vehicle including but not limited to bicycles, motorcycles, motorbikes, scooters, hoverboards, all-terrain vehicles, airplanes, and personal transports. The wearable wireless electronic signaling apparatus may provide a convenient "hands-free" and automated method of intentional signaling similar to the turn signals standardized in licensed motor vehicles, providing enhanced visibility of the wearer to onlookers and other motorists and riders sharing common commuter pathways. The wearable wireless electronic signaling apparatus removes from the wearer the inherent distraction of a screen or display and allows for seamless, non-distracting haptic directional change prompts to the wearer accompanied by automatic or purposeful signaling of intention.

The foregoing summary is illustrative only and not intended to be in any way limiting.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

The present invention will be described by way of exemplary embodiments, but not limitations, illustrated in the accompanying drawings in which like references denote similar elements, and in which.

DEFINITIONS

"Wearable" is herein defined as an article that may be worn by a human user.

"Pair" and its conjugates ("pairing", "paired", etc.) is herein defined as a method by which two or more electronic devices establish a wireless connection over a shared protocol.

DETAILED DESCRIPTION

In the Summary above, this Detailed Description, the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Figure 1:
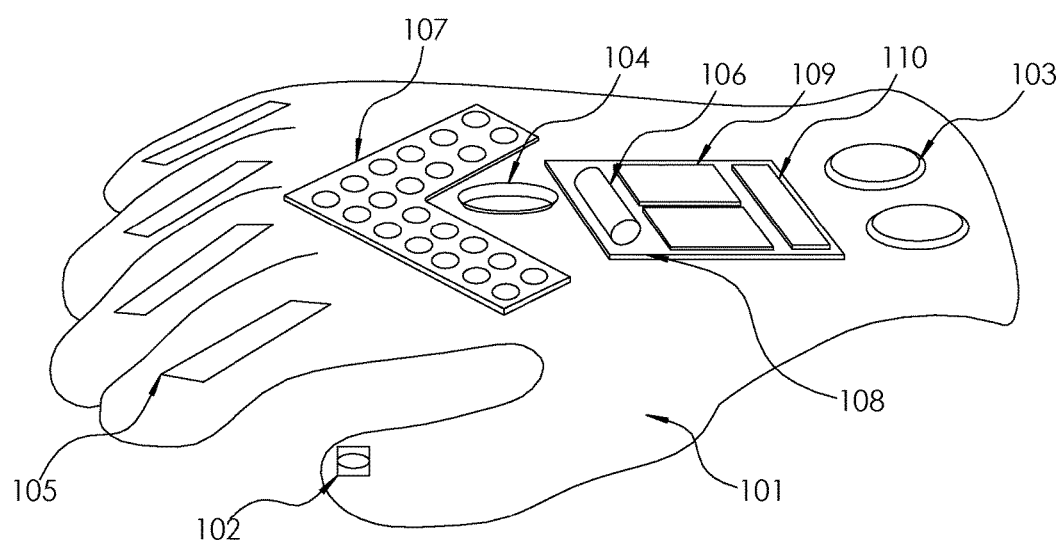
FIG. 1 illustrates an overhead view of a preferred embodiment of a wearable wireless electronic signaling apparatus.

FIG. 1 illustrates an assembled overhead view of a preferred embodiment of a wearable wireless electronic signaling apparatus. FIG. 1 includes a hand-fitted garment 101, a micro switch 102, a single or set of batteries 103, a haptic feedback apparatus 104, a single or set of light emitting diodes 105, a gyroscope apparatus 106, a second single or set of light emitting diodes 107, an embedded circuit board 108, a microprocessor 109, a wireless transmitter/receiver and digitizer 110, a haptic motor controller 111, and a multi-state button 112.

Garment 101 consists of any wearable with preferred embodiment as a glove worn over the entirety of the hand from wrist to digits and in alternative embodiments in the same shape but with open digits, or as a wrist or forearm band abutting but not worn past the boundary of the wrist. Garment 101 may be constructed in a variety of sizes to accommodate wearers of different hand and arm measurements and may be made of any appropriate material and in any appropriate color with the preferred embodiment as a leather-synthetic blend with a water-proof or -resistant outer layer and multiple internal insulating layers and padded reinforcements over the knuckles and finger joints, all colorized to a dark gray.

Micro switch 102 may be any miniature electronic switch, button, or touchpad such as a pushbutton, reed switch, toggle, rocker switch, slide pot, or capacitive or resistive touch sensor which responds to either pressure, heat, capacitance, or other mechanical actuation.

Battery or batteries 103 may be any appropriately sized replaceable electronic batteries or one or more dedicated rechargeable removable or non-removeable batteries.

Haptic feedback apparatus 104 may be comprised of any electronic mechanical vibration generator common in the art such as an eccentric rotating mass motor, a linear resonant actuator, or a piezoelectric actuator.

Light emitting diodes 105 and 107 may be comprised of any electroluminescent device including but not limited to p-n junction light-emitting diodes. Light emitting diodes 105 and 107 may be configured in any suitable manner such as in an outward directional vector along the horizontal plane of the hand and forearm and may be attached flexibly or rigidly to the wearable or to an intermediate platform layer. In some embodiments, light emitting diodes 107 may be arranged in an arrow-like 'V' shape and light emitting diodes 105 may be placed along the digits of a glove-shaped wearable for supplementary illumination.

Gyroscope 106 may comprise an embedded circuit gyroscope, gyrometer, and/or accelerometer.

Circuit board 108 may be comprised of any system-on-chip containing gyroscope 106, microprocessor 107, and transmitter/receiver 110 or may contain only microprocessor 109 with any suitable connection(s) to the other components.

Transmitter/receiver and digitizer 110 may be comprised of an electronic transmitter/receiver and digitizer utilizing any personal-area-network range wireless communication protocol or protocols including but not limited to Bluetooth or Wi-Fi.

Haptic motor controller 111 may be comprised of any electronic circuit interfaced physically or wirelessly with haptic feedback apparatus 104.

Multi-state button 112 may be comprised of any multiple state electronic switch, toggle, dial, or comparable device.

Figure 2:
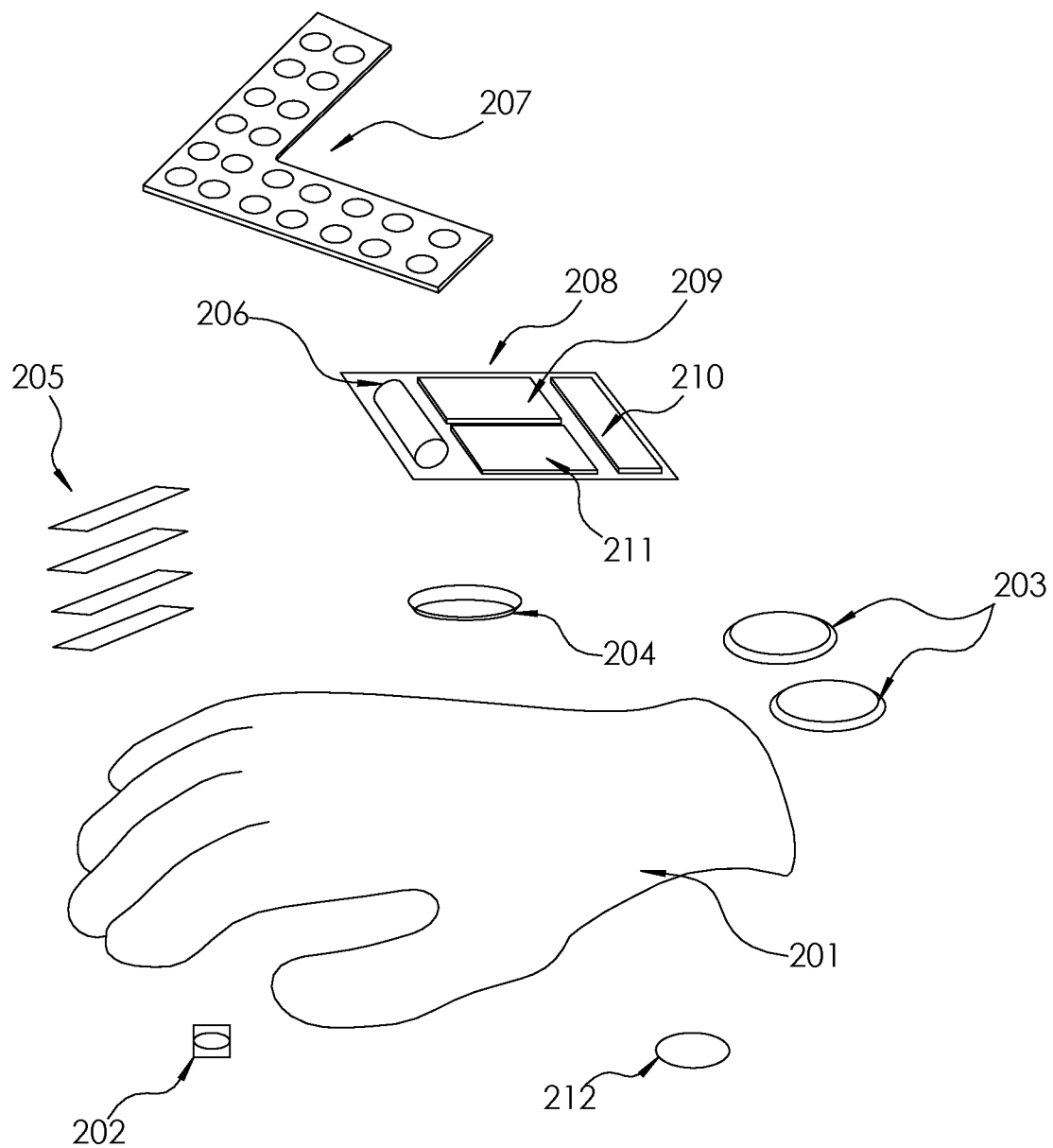
FIG. 2 illustrates a deconstructed exploded view of a preferred embodiment of same; and, FIG. 3 illustrates a schematic diagram of a preferred embodiment of same showing connections with external devices.

FIG. 2 illustrates a schematic diagram of a preferred embodiment of a wearable wireless electronic signaling apparatus. All numbered elements in FIG. 2 correspond to and are in the same order as those of FIG. 1 substituting '100' for '200'.

Figure 3:

FIG. 3 illustrates a schematic diagram of a preferred embodiment of a wearable wireless electronic signaling apparatus showing connections with external devices. FIG. 3 includes a wearable wireless electronic signaling apparatus 301, a navigation device 302, a digital application 303, and a turn signal transmitting apparatus 304.

Wearable 301 is the wearable wireless electronic signaling apparatus described in [0021] through [0031] above and shown in a preferred embodiment in FIG. 1 and FIG. 2.

Navigation device 302 may be comprised of any electronic device containing a digital wireless transmitter/receiver operating on the same protocol(s) as transmitter/receiver and digitizer 110 on FIG. 1 (210 on FIG. 2), contained within wearable 301. Said mobile device also executes digital application 303 providing real-time remotely or locally sourced navigational information and operator route change instructions/prompts.

Digital application 303 may be comprised of any digital application executed on navigation device 302.

Turn signal transmitting apparatus 304 may be comprised of any external electronic apparatus connected to the electronic or mechanical turn signaling system of the motor vehicle, operating on the same protocol(s) as the transmitter/receiver and digitizer 110 on FIG. 1 (210 on FIG. 2) contained within wearable 301.

In FIG. 3, wearable 301 and navigation device 302 establish a wireless communication connection to exchange data using a shared protocol such as Bluetooth or Wi-Fi. Navigation device 302, executing digital application 303, transmits route change signals to wearable 301. Wearable 301 optionally transmits a reciprocal signal to navigation device 302 pursuant to the requirements of the communication protocol in use such as to maintain a "pairing" connection. Wearable 301 also optionally accepts transmissions emitted from turn signal transmitting apparatus 304.

One example scenario where the wearable wireless electronic signaling apparatus would be greatly useful is in the operation of a motorcycle, particularly in conditions of inclement weather or during nighttime. The operator may pre-program a destination and route in a mobile device such a smartphone. Said smartphone will transmit route information to the wearable's receiver en route using dedicated software and provide prompts as the rider approaches a course change such as a turn, receiving, for example, an initial haptic pulse at 500 feet prior to the turn, then again at 200 feet, and again at 100 feet, then at decreasing intervals becoming a constant or rapidly pulsating haptic indication as the turn approaches. When the rider negotiates the turn the wearable's light-emitting diode arrays will luminesce on the appropriate side automatically and/or upon manual activation by the rider via predetermined gestures, touch/pressure activation of the wearable's micro switch, or activation of the motorcycle's dedicated turn signals. Said LED arrays will automatically deactivate once the turn has been negotiated and/or upon manual deactivation by the rider using the same means previously specified.

The wearable wireless electronic signaling apparatus may be utilized by motorcycle operators, bicycle riders, operators of all-terrain vehicles when driving on public roads and streets, or any other motor- or human-powered vehicle. The wearable wireless electronic signaling apparatus makes signaling of intention to change direction, move lanes, or otherwise easy, safe, and seamless without distraction or requiring a glance away from the road. The wearable wireless electronic signaling apparatus provides route information and directional change prompts to the rider in a manner that does not require even brief or momentary preoccupation by the rider while simultaneously providing appropriate signaling of intention to other commuters and pedestrians. The wearable wireless electronic signaling apparatus' dedicated luminescent diodes may be activated in at least four distinct means including automatic activation from the connected mobile device, automatic activation from the apparatus connected to the vehicles electronic turn signals, manual activation upon pressing of the embedded micro switch, or manual activation by means of gestures consisting of motions of the hand and forearm.

While the present invention has been related in terms of the foregoing embodiments those skilled in the art will recognize that the invention is not limited to the embodiments described. The present invention may be practiced with modification and alteration within the spirit and scope of the appended claims. Thus, the description is to be regarded as illustrative instead of restrictive on the present invention.

While preferred and alternate embodiments have been illustrated and described, as noted above, many changes can be made without departing from the spirit and scope of the Wearable Wireless Electronic Signaling Apparatus And Method Of Use. Accordingly, the scope of the Wearable Wireless Electronic Signaling Apparatus And Method Of Use not limited by the disclosure of these preferred and alternate embodiments. Instead, the scope of the Wearable Wireless Electronic Signaling Apparatus And Method Of Use be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶6. In particular, the use of "step of" in the claims herein is not intended to invoke the provisions of U.S.C. § 112 ¶6.

What is claimed is:

1. A wearable system for providing course information for a vehicle, comprising:
   one or more garments;
   one or more light emitting devices;
   one or more micro processing units;
   one or more electronic activation apparatuses;
   an embedded circuit complex;
   one or more haptic feedback apparatuses;
   one or more motion detection apparatuses;
   one or more embedded wireless receiving and transmitting apparatuses;
   one or more mobile computing apparatuses;
   wherein the embedded circuit complex comprises one or more embedded wireless receiving and transmitting apparatuses;
   wherein the one or more motion detection apparatuses comprise gyrometers;
   wherein the one or more motion detection apparatuses comprise accelerometers;
   wherein the one or more motion detection apparatuses comprise inclinometers;
   wherein the one or more garments comprises gloves;
   wherein the one or more light emitting devices are fastened to the one or more garments;
   wherein the one or more light emitting devices is controlled by the one or more micro processing units;
   wherein the one or more micro processing units are engaged by the one or more electronic activation apparatuses;
   wherein the one or more electronic activation apparatuses are separately and individually connected to the embedded circuit complex;
   wherein one or more haptic feedback apparatuses are separately and individually engaged by the one or more micro processing units;
   wherein one or more motion detection apparatuses are engaged by the one or more micro processing units;
   wherein one or more mobile computing apparatuses connect wirelessly to the one or more micro processing units separately and individually by one or more embedded wireless receiving and transmitting apparatuses;
   wherein the one or more mobile computing apparatuses execute one or more software applications; and
   wherein one or more wireless transmission apparatuses are fastened to a vehicle and connect wirelessly to the one or more micro processing units by the one or more embedded wireless receiving and transmitting apparatuses.

2. The device as in claim 1 wherein the one or more garments is a glove fitted over the fingers and hand of the wearer and terminating at the wrist.

3. The device as in claim 1 wherein the one or more garments is a fingerless glove fitted over the proximal phalanges of the fingers and hand of the wearer terminating at the wrist.

4. The device as in claim 1 wherein the one or more garments is a wrist sleeve fitted over the wrist and partial forearm of the wearer.

5. The device as in claim 1 wherein the one or more garments is comprised of any textile material, including leather, vinyl, polyester, nylon, polyurethane, and polyvinyl chloride.

6. The device as in claim 1 wherein the one or more light emitting devices are comprised of any suitable miniature lighting devices including light emitting diodes.

7. The device as in claim 1 wherein the one or more embedded micro processing units are comprised of a plurality of micro controllers.

8. The device as in claim 1 wherein the one or more embedded micro processing units are comprised of a plurality of system-on-chip devices.

9. The device as in claim 1 wherein the one or more electronic activation apparatuses are comprised of any suitable finger actuated button devices.

10. The device as in claim 1 wherein the one or more electronic activation apparatuses are comprised of a plurality of motion detecting apparatuses including gyrometers, accelerometers, and inclinometers.

11. The device as in claim 1 wherein in the one or more electronic activation apparatuses are comprised of any suitable finger actuated capacitive button devices.

12. The device as in claim 1 wherein the one or more haptic feedback mechanisms are comprised of any suitable miniature mechanical vibration producing apparatuses.

13. The device as in claim 1 wherein the one or more motion detection apparatuses are comprised of any suitable electronic and mechanical detectors of movement generating an electronic signal containing data regarding said movement to the embedded micro processing units.

14. The device as in claim 1 wherein the one or more mobile computing apparatuses are comprised of any suitable portable computing device such as a smartphone, tablet, laptop computer, or GPS device.

15. The device as in claim 1 wherein the one or more software applications are comprised of any suitable software applications which track and calculate geospatial position and route calculation.

16. The device as in claim 1 wherein the one or more wireless transmission apparatuses are comprised of any suitable radiofrequency generating and receiving devices capable of wireless communication over a specified frequency and transmission protocol including Bluetooth™ or Wi-Fi™.

17. The device as in claim 1 wherein the one or more wireless transmission apparatuses are connected by electronic or mechanical means to a turn signal lighting system of a vehicle.

18. The device as in claim 1 wherein the one or more haptic feedback apparatuses provide vibrational indication of an imminent turn to the wearer.

19. The device as in claim 1 wherein the one or more motion detection apparatuses detect specified motions made by the wearer and transmit data to the micro processing units.

20. The device as in claim 1 wherein the one or more motion detection apparatuses transmit an electronic signal causing activation or deactivation of the embedded lights and haptic feedback apparatuses.

21. The device as in claim 1 wherein the electronic activation apparatuses are activated by touch or pressure of the wearer's fingers.

22. The device as in claim 1 wherein the electronic activation apparatuses transmit an electronic signal causing activation or deactivation of the embedded lights and haptic feedback apparatuses.

23. The device as in claim 1 wherein the electronic activation apparatuses or the motion detection apparatuses cause transmission of wireless signals to the wireless transmission apparatuses.

* * * * *